United States Patent [19]

Blewett

[11] Patent Number: 5,835,718
[45] Date of Patent: Nov. 10, 1998

[54] URL REWRITING PSEUDO PROXY SERVER

[75] Inventor: Charles Douglas Blewett, Madison, N.J.

[73] Assignee: AT&T Corp, Middletown, N.J.

[21] Appl. No.: 631,720

[22] Filed: Apr. 10, 1996

[51] Int. Cl.[6] .................................................. G06F 17/30
[52] U.S. Cl. .............................. 395/200.48; 395/200.33; 395/200.49
[58] Field of Search ......................... 395/200.01, 200.48, 395/200.49, 200.59, 200.33

[56] References Cited

U.S. PATENT DOCUMENTS

| | | |
|---|---|---|
| 5,444,848 | 8/1995 | Johnson, Jr. et al. ............. 395/200.15 |
| 5,636,216 | 6/1997 | Fox et al. ................................. 370/402 |
| 5,678,041 | 10/1997 | Baker et al. ............................. 395/609 |
| 5,708,780 | 1/1998 | Levergood et al. . |

Primary Examiner—Eric Coleman
Assistant Examiner—Mackly Monestime

[57] ABSTRACT

A method for real time remapping of access to a selected remote domain in an interconnected computer system network comprising the steps defining a pseudo proxy server and translating in the pseudo proxy server a remote record identifier corresponding to the remote domain to a remapped record identifier corresponding to the local domain. In a further enhancement the method comprises the additional step of determining if a selected record identifier is a selected remapped record identifier.

38 Claims, 2 Drawing Sheets

URL REWRITING PSEUDO PROXY SERVER

FIELD OF THE INVENTION

This invention relates to the field of interconnected computers, and more particularly to the field of formatted data distributed on interconnected computers.

BACKGROUND OF THE INVENTION

Because the Internet evolved from the ARPAnet, a research experiment that supported the exchange of data between government contractors and (often academic) researchers, an on-line culture developed that is alien to the corporate business world. The Internet was not designed to make commercialization easy.

Domain names direct where e-mail is sent, files are found, and computer resources are located. They are used when accessing information on the WWW or connecting to other computers through Telenet. Internet users enter the domain name, which is automatically converted to the Internet Protocol address by the Domain Name System (DNS). The DNS is a service provided by TCP/IP that translates the symbolic name into an IP address by looking up the domain name in a database.

The World Wide Web (WWW) is one of the newest Internet services. The WWW allows a user to access a universe of information which combines text, audio, graphics and animation within a hypermedia document. Links are contained within a WWW document which allows simple and rapid access to related documents. The WWW was developed to provide researchers with a system that would enable them to quickly access all types of information with a common interface, removing the necessity to execute a variety of numerous steps to access the information. During 1991, the WWW was released for general usage with access to hypertext and UseNet news articles. Interfaces to WAIS, anonymous FTP, Telnet and Gopher were added. By the end of 1993 WWW browsers with easy to use interfaces had been developed for many different computer systems.

With HyperText Markup Language (HTML) based pages, such as the WWW, the pages of information contain pointers to other pages. The pointers, are links which are encoded with Uniform Resource Locators (URLs). The URL contains a transmission protocol, such as HyperText Transfer Protocol (HTTP), a domain name of the target computer system, and a page identifier.

Accordingly, with the commercialization of the Internet through advertising, charging for access to information, and other schemes there is a need for an Internet Service Provider (ISP) to record all of the interactions that their customers have with HTML based content.

SUMMARY OF THE INVENTION

In an interconnected computer system network there is provided a method for real time remapping of a remote domain to a local domain. The method comprising the steps defining a pseudo proxy server and translating in the pseudo proxy server a remote record identifier corresponding to the remote domain to a remapped record identifier corresponding to the local domain. In a further enhancement the method comprises the additional step of determining if a selected record identifier is a selected remapped record identifier.

In an enhancement of the present invention, there is provided a method of providing pseudo proxy access for tracking and controlling access to remote record identifiers. The method comprising the steps of: providing a first data set having rewritten record identifiers for a remote record identifier to a local user; responding to a request from the local user for a selected record identifier; determining if the selected record identifier is a rewritten record identifier; determining an actual record identifier for the rewritten record identifier; and requesting a second data set corresponding to the actual record identifier from said interconnected computer system network.

In an another enhancement of the present invention the first data set comprises a HyperText Markup Language based data set.

In a further enhancement of the present invention the remote record identifier comprises a uniform record locator.

In yet a further enhancement the present invention comprises the additional steps of determining that a record identifier is remote and rewriting the remote record identifier.

Determining that the record identifier is remote in an enhancement of the present invention comprises the step of scanning a domain name of the actual record identifier and comparing the domain name to a local domain name wherein the record identifier is remote if the domain name is different than the local domain name.

In yet further enhancements of the present invention the step of determining an actual record identifier for the rewritten record identifier comprises looking up the actual record identifier by a predetermined index, by a hashing table, by addressing a memory location, by accessing an inode of a disk file, or by accessing a disk file by a file name.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
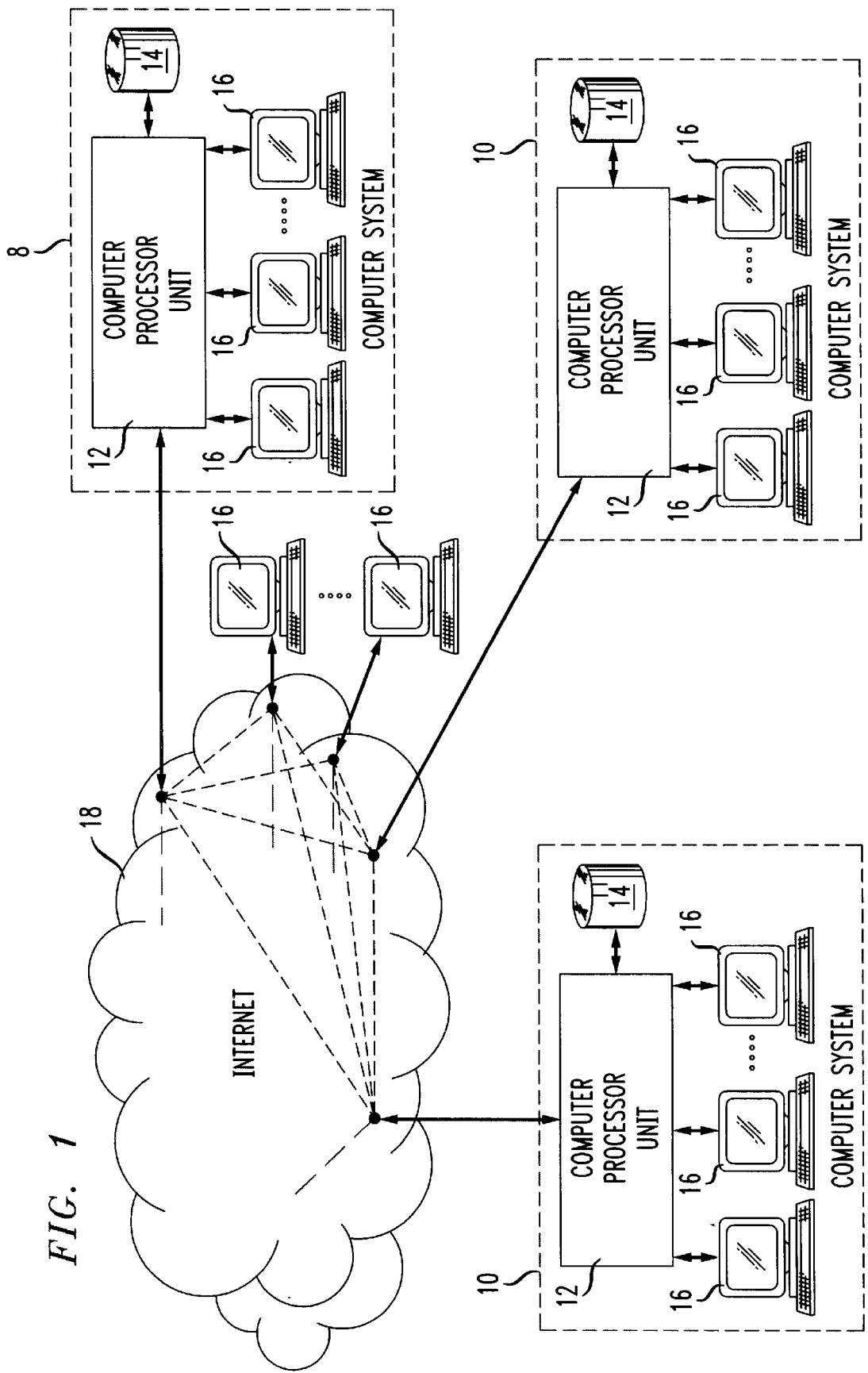
FIG. 1 is an overview of interconnected computer system networks employing the present invention.

Although the present invention is particularly well suited for use as a URL rewriting pseudo proxy server for the WWW, and shall be described with respect to this application, the methods and apparatus disclosed here can be applied to other schemes employing URLs as well as other types of resource location pointers and other record identifiers as links within an interconnected computer system network.

The WWW allows a user to access a universe of distributed information which combines text, audio, graphics and animation within a hypermedia document. Links are contained within a WWW document which allows simple and rapid access to related documents. The WWW provides an access system that enables users to quickly access all types of information with a common interface, removing the necessity to execute a variety of numerous steps to access the information. The WWW supports interfaces for access to HyperText, UseNet news, WAIS, anonymous FTP, Telnet and Gopher.

The WWW has HTML based pages, which contain pointers to other pages. The pointers, are HyperText links which are encoded with URLs. The URL contains a transmission protocol, such as HTTP, a domain name of the target computer system, and a page identifier.

The HyperText links are simply references to other documents, made up of two parts. The first part is a reference to a related item such as a document, picture, movie or sound. The item being referenced can be within the current document, or it can be located anywhere on the Internet. The second part is an anchor. The anchor can be defined to be a word, group of words, a picture, or any area of the display. A reader activates an anchor by pointing to it and clicking with a mouse, when using a graphical browser, or by selecting it with the cursor (arrow) keys or tab keys, when using a texted based browser. Anchors can be indicated in the displayed document by color, graphics, reverse video, underline as well as other formats.

When an anchor is activated, the browser fetches the item referenced by the anchor. This may involve reading a document from a local disk drive, or requesting over the Internet that a document be sent to the local computer.

The standard way an item is referenced is by a URL. The URL contains a complete description of the item, which is made up of a protocol and an address. An absolute address reference contains the complete address including domain name, directory path, and file name. A relative address reference assumes that the previous domain name and directory path are used.

The URL is not limited to identifying WWW HyperText files, but can also access other sets of data in different protocols including anonymous FTP, Gopher, WAIS, UseNet news, and Telenet. The URL format is typically P://A. P is the protocol, such as HTTP (HyperText Transfer Protocol), gopher, FTP (file transfer protocol), WAIS (Wide Area Information Server), news (UseNet news groups), or Telenet. A is a valid Internet host address or symbolic location.

To better understand the present invention, an example of an embodiment in which a newspaper consortium composed of individual members are interconnected through the Internet shall be used. An individual member may want to provide access to all of the consortium member organizations, but would only track their local subscribers.

Referring to FIG. 1 there is shown an overview of interconnected computer system networks. Each computer system network 8 and 10 contains a local computer processor unit 12 which is coupled to a local data storage unit 14. The local computer processor unit 12 is selectively coupled to a plurality of local users 16. Each of the computer processor units 12 are selectively coupled to other computer processor units 12 through the Internet 18. Local users 16 are also selectively coupled directly to the Internet 18.

A local newspaper, which has a computer system network 8, such as the Local Paper in Wyoming, may allow a local user 16 to click into another computer system network 10, such as a Regional Paper in New York through the Internet 18 to access a data storage unit 14 on the other computer system network 10. The Local Paper computer system network 8 would handle the billing for the local user 16 and provide an authentication and reconciliation scheme with the Regional Paper computer system network 10, permitting both papers to profit from the venture.

The current technology utilized over the Internet, specifically HTML based pages does not provide a suitable means for achieving the desired scheme. The HTML based pages contain hyper links encoded as URLs, to other pages. If we assume that the Regional Paper has a machine (domain) name of regional-paper.com for its computer system network 10 and a HTML page about regional news today called regional-today.html, a URL pointing to the regional news today at the Regional Paper would be http://regional-paper.com/regional-today.html which allow access to the appropriate HTTP page through the Internet 18. In this case the URL acts as a remote record identifier.

If this URL is included in an HTML page served by the computer system network 8 of the Local Paper HTTP server, the computer system network 8 of the Local Paper would have no way of telling if or when the local user 16 accessed the regional-today page on the other computer system network 10. Selecting the URL results in the other computer system network 10 of the regional-paper.com being accessed and the computer system network 8 of the local-paper.com is not involved in the access.

Figure 2:
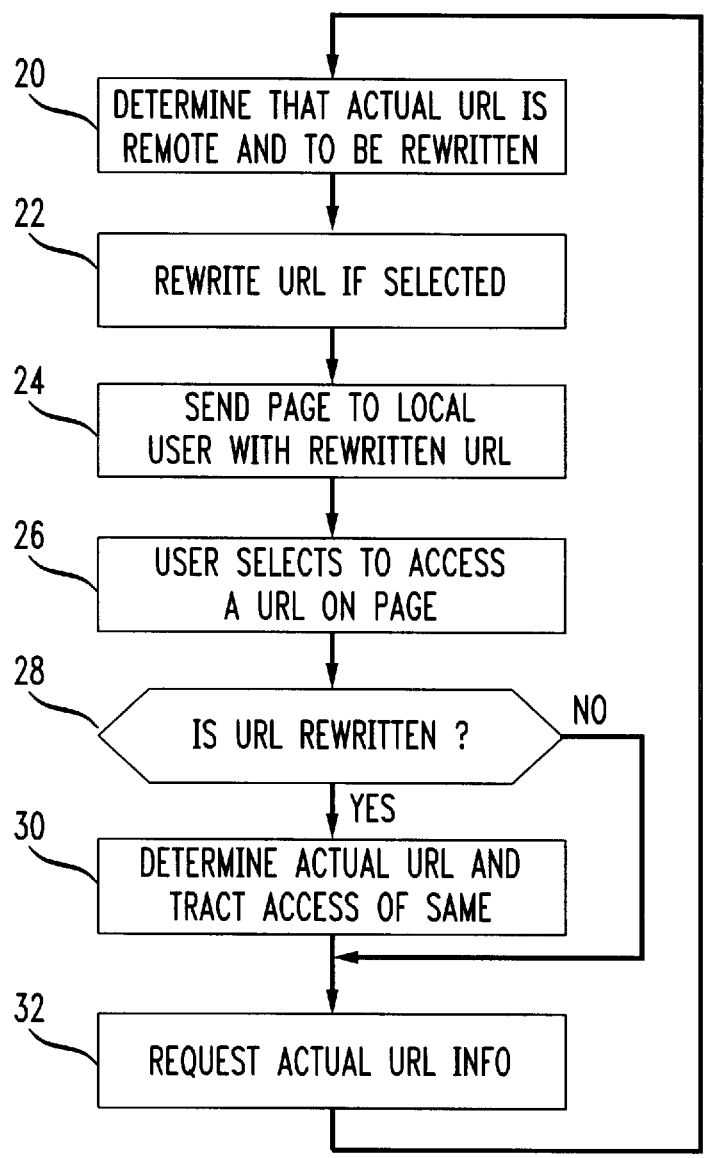
FIG. 2 is a flow chart of the procedures of the present invention which for tracking local access and local control by rewriting URL's.

An elegant way to achieve tracking of access and local control is to make all of the URL's local to the local-paper.com machine, thus permitting the localpaper.com machine to track and control access. Referring to FIG. 2, there is shown a flow chart of the procedures of the present invention which accomplishes tracking of local access and local control by rewriting the URL's on the fly as they pass through the local-paper.com machine in being served to the local user. In step 20, it is determined on the fly if the actual URL is remote and if it is to be rewritten. All remote URL's may be selected for rewriting, or selective groups may be selected for rewriting. The selection may be based upon the remote domain name which can be compared with a list of remote domain names that are to be tracked as well as other comparison criteria. Thus, in step 22 the selected remote URL http://regional-paper.com/regional-today.html would be rewritten as http://local-paper.com/127.html while the text and graphics on the HTML page would remain the same.

In step 24 the local system sends the HTML page containing the rewritten URLs to the local user. In step 26 the local user clicks on (selects) a URL on the HTML page, thus requesting the document 127.html from the local-paper.com machine. In step 28 the local HTTP server determines if this is a rewritten URL. If the URL is rewritten, step 30 looks up the actual URL, and in step 32 sends the HTML page from the regional-paper.com machine. If the URL was not rewritten, step 30 is skipped. It is highly desirable that the rewritten URL's be "blind" and not easily decoded, in order that a user could not easily defeat the rewriting mechanism. After step 30 the procedure can repeat again from step 20.

The local-paper.com machine by serving up the HTML page from the regional-paper.com is acting as a pseudo proxy. Proxy servers are often employed in environments that contain firewalls. There, the proxy acts on behalf of the user through the firewall, directing all HTTP access through it is not desirable to supply proxy service to every user. Many users access the Internet through a corporate firewall. It is desirable to leave the user's environment(s) unchanged. The URL rewrite scheme does this by being completely transparent to the end user. URL's that are not rewritten, which are links that we do not want to track, are not rewritten and behave as usual.

The proxy server in the rewrite scheme is a pseudo proxy or domain specific proxy, in that the server only acts as a proxy for the HTML pages that it is hosting and the pages that it is pointing to. Typically, proxies have all or no requests sent through them. In the present invention, with the pseudo proxy, only the requests in its domain are served. The conversion of the original remote URL to a local/pseudo proxy based URL can be implemented efficiently. The rewriting of the URLs is a remapping of selected record identifies from one domain to another domain (between a local and a remote domain).

First the URL is recognized as a remote URL, which is shown as step 20. This can be accomplished by scanning the domain name part of the URL. If the domain name is remote when compared to a local domain name or when compared to a predetermined table of domain names that are to be tracked, the remote URL is replaced by an opaque local URL which is shown in step 22. An opaque URL is one that the user can not easily generate or reconstruct the remote URL from, as this would subvert the process. This can be accomplished by using indices that are private to the HTTP server. The generation of the indices can be accomplished from a local register, an incremented integer, or memory address from where the string is stored in a database, the inode of a disk file, or a simple disk file name.

The conversion of the proxy URL can be done by using indices. The number is an index into an array where the actual remote URL is stored, utilizing a minimal perfect hash. Hashing is a technique for arranging a set of items, in which a hash function is applied to the key of each item to determine its hash value. The hash value identifies each item's primary position in a hash table, and if this position is already occupied, the item is inserted either into an overflow table or in another available position in the table.

The indices also provide a simple way of tracking access to the remote URLs, with the level of detail tracking limited only by the level of detail that is recorded. Further, the indices can be utilized to determined if access to the remote URL is to be granted or denied and may depend upon the particular status or identity of a local user.

An alternative scheme is when the name is a number of a memory address or a key stored in a database. Another alternative scheme is to utilize the disk inode which requires that the inode be looked up in the disk inode table. When a disk file name is used, the file is opened which can contain the remote URL.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In an interconnected computer system network a method of tracking and controlling access to remote record identifiers, said method comprising the steps of:
   providing a first data set having a rewritten record identifier for a remote record identifier to a local user;
   responding to a request from said local user for a selected record identifier;
   determining if said selected record identifier is a rewritten record identifier;
   determining an actual record identifier for said rewritten record identifier; and
   requesting a second data set corresponding to said actual record identifier from said interconnected computer system network.

2. The method as recited in claim 1 wherein said first data set comprises a hypertext markup language based data set.

3. The method as recited in claim 1 wherein said remote record identifier comprises a uniform record locator.

4. The method as recited in claim 1 comprising the additional steps of determining that a record identifier is remote and rewriting said remote record identifier.

5. The method as recited in claim 4 wherein the steps of determining that a record identifier is remote comprises scanning a domain name of said actual record identifier and comparing said domain name to a local domain name wherein said record identifier is remote if said domain name is different than said local domain name.

6. The method as recited in claim 1 wherein the step of determining an actual record identifier for said rewritten record identifier comprises looking up said actual record identifier by a predetermined index.

7. The method as recited in claim 6 wherein the step of determining an actual record identifier further comprises a hashing table.

8. The method as recited in claim 7 wherein said hashing table comprises a minimal perfect hash.

9. The method as recited in claim 6 wherein the step of determining an actual record identifier further comprises addressing a memory location.

10. The method as recited in claim 6 wherein the step of determining an actual record identifier further comprises accessing an inode of a disk file.

11. The method as recited in claim 1 wherein the step of determining an actual record identifier for said rewritten record identifier comprises accessing a disk file by a file name.

12. The method as recited in claim 11 wherein said disk file contains a domain name of said actual record identifier.

13. The method as recited in claim 11 wherein said disk file contains said actual record identifier.

14. The method as recited in claim 1 wherein said request from said local user comprises a hypertext transfer protocol request.

15. In an interconnected computer system network a method of providing pseudo proxy access for tracking and controlling access to remote uniform record locators, said method comprising the steps of:
    providing a hypertext markup language based page having a rewritten uniform record locator for a remote uniform record locator to a local user;
    responding to a request from said local user for a selected uniform record locator;
    determining if said selected uniform record locator is a rewritten uniform record locator;
    determining an actual uniform record locator for said rewritten uniform record locator; and
    requesting a second data set corresponding to said actual uniform record locator from said interconnected computer system network.

16. The method as recited in claim 15 comprising the additional steps of determining that a uniform record locator is remote by comparing a domain name of said uniform record locator to a local domain name, wherein said uniform record locator is remote if said domain name is different than said local domain name and rewriting said remote uniform record locator.

17. The method as recited in claim 15 wherein the step of determining an actual uniform record locator for said rewritten uniform record locator comprises looking up said actual uniform record locator by a predetermined index.

18. The method as recited in claim 17 wherein the step of determining an actual uniform record locator further comprises a hashing table.

19. The method as recited in claim 18 wherein said hashing table comprises a minimal perfect hash.

20. The method as recited in claim 15 wherein the step of determining an actual uniform record locator further comprises addressing a memory location.

21. The method as recited in claim 15 wherein the step of determining an actual uniform record locator further comprises accessing an inode of a disk file.

22. The method as recited in claim 15 wherein the step of determining an actual uniform record locator for said rewritten uniform record locator comprises accessing a disk file by a file name.

23. The method as recited in claim 15 comprising the additional steps of determining that a uniform record locator is remote by comparing a domain name of said uniform record locator to compared to a predetermined table of domain names and rewriting said remote uniform record locator.

24. In a computer server, a method of establishing a pseudo server, comprising the steps of:

receiving a request from a user, fetching data requested by the user, said data containing pointers to secondary data, identifying remote pointers, pointers that point to data remote from the computer server, storing the remote pointers at the computer server, generating rewritten pointers for the remote pointers, the rewritten pointers pointing to the corresponding stored remote pointers, and transmitting the fetched data and rewritten pointers to the user.

25. The method of claim 24, wherein the rewritten pointers are blind pointers.

26. The method of claim 24, wherein the pointers are Uniform Resource Locators.

27. The method of claim 24, wherein the rewritten pointer references a disk file.

28. The method of claim 24, wherein the rewritten pointer references a location in memory.

29. The method of claim 24, wherein the user communicates with the computer server through the Internet.

30. The method of claim 24, wherein the user communicates with the computer server directly.

31. The method of claim 24, further comprising steps of:

receiving a request from the user, the request including a selected pointer, determining whether the selected pointer is a rewritten pointer and, if so, retrieving the stored remote pointer corresponding to the selected pointer, and retrieving data referenced by the retrieved remote pointer.

32. The method of claim 24, wherein the remote pointers are uniform resource locators.

33. The method of claim 24, wherein said generating step includes a step of looking up said remote record identifier by a predetermined index.

34. The method of claim 33, wherein said index is a hashing table.

35. The method of claim 34, wherein said hashing table includes a minimal perfect hash.

36. The method of claim 24, wherein said remote pointers are stored in a file by file name.

37. The method of claim 24, wherein said remote pointers are stored in a file by an inode.

38. The method of claim 24, wherein the request is a hypertext transfer protocol request.

* * * * *